Oct. 9, 1962  HANS-HEINRICH BERNING ETAL  3,058,109
SPEED DETECTING METHODS AND ARRANGEMENTS
Filed Aug. 4, 1958  2 Sheets-Sheet 1

INVENTORS
Hans-Heinrich Berning
and Karl Tredopp
BY Michael S. Striker
Attorney

Oct. 9, 1962    HANS-HEINRICH BERNING ETAL    3,058,109
SPEED DETECTING METHODS AND ARRANGEMENTS
Filed Aug. 4, 1958                                           2 Sheets-Sheet 2

INVENTORS
Hans-Heinrich Berning
and Karl Tredopp
BY
Michael S. Striker
Attorney

United States Patent Office 3,058,109
Patented Oct. 9, 1962

3,058,109
SPEED DETECTING METHODS AND
ARRANGEMENTS
Hans-Heinrich Berning and Karl Tredopp, Dusseldorf,
Germany, assignors to Robot, Berning und Co., Dusseldorf, Germany
Filed Aug. 4, 1958, Ser. No. 752,858
Claims priority, application Germany Aug. 2, 1957
16 Claims. (Cl. 346—1)

The present invention relates to methods and arrangements for detecting the speed of a vehicle.

The present invention may be used by law enforcement agencies for detecting vehicles which travel at excessive speeds.

At the present time the methods and devices used for detecting vehicle speeds are not only relatively complex and expensive, but in addition it is necessary to carry out calculations before the vehicle speed can be determined and furthermore legal evidence requirements are not always met.

One of the objects of the present invention is to provide a speed detecting method and arrangement which is both simple and inexpensive without sacrificing accuracy or evidential value.

Another object of the present invention is to provide a method and arrangement which reliably indicate not only when a vehicle is travelling at an excessive speed but also at least the particular speed range of the vehicle above the permissible vehicle speed.

A further object of the present invention is to provide a speed detecting arrangement which is fully automatic and can be left unattended.

An additional object of the present invention is to provide a method and arrangement capable of indicating at a glance the speed of a vehicle without requiring any calculations to be carried out.

With the above objects in view the present invention includes in a method of detecting the speed of a vehicle the steps of initiating a fixed predetermined time interval when the vehicle passes through a predetermined location along a given path, and at the end of this time interval photographing an elongated section of the path in which the vehicle is located, so that from the distance between this section of the path and the above predetermined location thereof as well as from the position of the vehicle along the section of the path as shown by the photograph, the speed of the vehicle is indicated.

Also with the above objects in view the present invention includes in an arrangement for detecting the speed of a vehicle, a camera means which is focused on an elongated section of a path for photographing this section of the path when a vehicle travels therealong. An actuating means cooperates with the camera means for actuating the same automatically to take a photograph when a fixed predetermined time interval has elapsed after the actuating means has started to operate. A combined sensing and starting means is situated at a location of the path which is at a predetermined distance in advance of the above elongated section of the path for sensing when a vehicle is at this location, the combined sensing and starting means cooperating with the actuating means for starting the operation thereof simultaneously with the sensing of a vehicle at the above location of the path, so that the position of the vehicle along the above section of the path indicated by the photograph taken by the camera means shows the speed of the vehicle.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
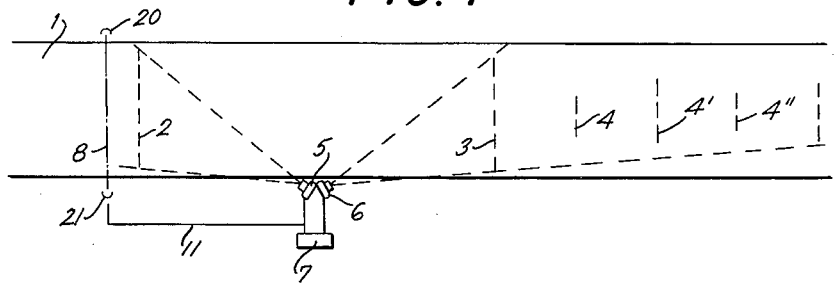
FIG. 1 is a diagrammatic plan view illustrating the process and arrangement of the present invention.

Referring now to the drawings, FIG. 1 shows in plan view a part of a road 1 which forms a path along which a vehicle such as an automobile is adapted to travel. The road 1 is provided with brightly colored lines 2 and 3 extending transversely thereof, and these lines are located at a predetermined distance from each other. For example, the lines 2 and 3 may be positioned 20 meters apart from each other. It is assumed that the vehicles travel from left to right, as viewed in FIG. 1, so that the length of the path located between the lines 2 and 3 forms a predetermined measured distance of travel for the vehicle, the vehicle entering upon the measured distance when it crosses the line 2 and leaving the measured distance when it crosses the line 3.

The line 3 also serves as the entrance end to an elongated section of the path of travel located immediately subsequent to the precisely measured portion extending between the lines 2 and 3. This elongated section of the path is provided with additional brightly colored lines 4, 4', 4" which also extend transversely of the path and which are arranged at predetermined intervals.

The selected length of the path which extends between the lines 2 and 3 is equal to the distance which a vehicle travels for a fixed predetermined length of time when moving at a constant speed equal to the speed limit. If the vehicle travels at a speed higher than the speed limit then after this fixed predetermined length of time has elapsed the vehicle will be located beyond the line 3 somewhere in the elongated section which includes the lines 4, 4', 4".

Figure 3:
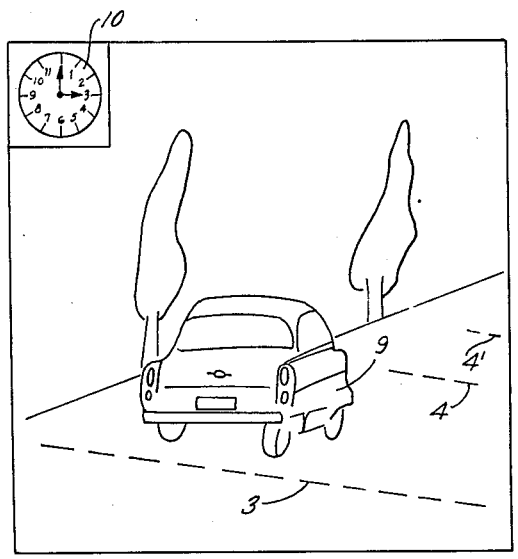
FIG. 3 illustrates a photograph taken by another part of the structure of the invention.

In accordance with the present invention a camera means is provided for photographing the elongated section of the path which starts at the line 3 precisely at the above fixed predetermined length of time after the vehicle has passed through the location determined by the line 2, and a photograph obtained in this way will show firstly that the vehicle is speeding simply by being located beyond the line 3 and secondly the extent of speeding according to the position of the vehicle in the photograph with respect to the lines 3, 4, 4', 4". The camera means 6 diagrammatically indicated in FIG. 1 is provided for this purpose, and it will be noted that in the particular example illustrated in FIG. 1 the camera means 6 is located between the lines 2 and 3 and focused on the elongated section which starts with the line 3 so that the photograph will show the rear of the vehicle. Such a photograph is illustrated in FIG. 3 where the vehicle 9 is shown between the lines 3 and 4. By thus photographing the rear of the vehicle after it passes the camera means 6 the rear license plate of the vehicle appears in the photograph for identification purposes.

Any suitable time indicator which may indicate not only the time of day but also the date may be located in or have its image reflected into the viewing field of the camera means 6 so that the time indicator is also photographed as indicated at 10 in FIG. 3, so that the photograph also indicates when it was taken so as to enhance its evidential value.

The photograph as shown in FIG. 3 indicates at a glance, without any further calculations, that the vehicle 9 was exceeding the speed limit, since if it were travelling within the speed limit it either would not be in the photograph at all or would be located at the side of line 3 opposite from that indicated in the photograph. Furthermore, the photograph indicates at a glance the speed range of the vehicle. Thus, where the distance between lines 2 and 3 is equal to 20 meters and the speed limit is 40 km./h., a period of time equal to 1.8 seconds will elapse if the vehicle travels at a constant speed of 40 km./h. from the line 2 to the line 3. The camera means 6 is automatically actuated in accordance with the present invention in the manner described below so as to take the photograph precisely 1.8 seconds after the vehicle travels through the location determined by the line 2. Of course, for different speed limits the distance between the lines 2 and 3 and/or time interval can be changed. Thus, for the same time interval the distances between lines 2 and 3 would be 25 meters for a speed limit of 50 km./h. and 30 meters for a speed limit of 60 km./h. The distance between the lines 3 and 4 is 5 meters, and the distance between the lines 4 and 4' is 5 meters. Thus, the line 4 is located at a distance of 25 meters from the line 2 in the illustrated example and therefore the photograph shown in FIG. 3 indicates that the vehicle was travelling at a speed between 40 and 50 km./h. If the vehicle appears in the photograph between the lines 4 and 4', then it is known at a glance that the vehicle was travelling at a speed of 60 km./h. In this way the photograph indicates the speed range of a vehicle which exceeds the speed limit.

The camera means 6 is actuated by an actuating means which automatically operates the camera means 6 when a fixed predetermined time interval (1.8 seconds in the above example) has elapsed after the actuating means has started to operate, and this actuating means is preferably electrical. Thus, an electric operating means, as described below, cooperates with the camera means 6 to actuate the same, and this operating means is electrically connected with a time delay means 7 of a well known construction which includes suitable relays so that after the time delay means has been energized and operates for the fixed predetermined time interval the electric operating means is energized to operate the camera means 6.

A combined sensing and starting means is located at the location of the path of travel determined by the line 2 for sensing the passing of a vehicle through this location and for simultaneously starting the operation of the above-referred to actuating means so as to start the measurement of the time interval by the time delay means 7 which will result in automatic operation of the camera means 6 when the fixed predetermined time interval has elapsed after the vehicle passes through the location determined by the line 2. In the example of FIG. 1, this combined sensing and starting means includes a photocell 21 and a light source 20 respectively located at opposite sides of the path 1, so that the light source 20 directs a beam of light 8 across the path of travel of the vehicle to the photocell 21. These elements are connected electrically with the time delay means 7 through an electrical circuit 11 for automatically starting the operation of the time delay means 7 when the light beam 8 is interrupted by the vehicle. The beam 8 may be arranged slightly in advance of the line 2 to compensate for the length of the vehicle.

Figure 2:
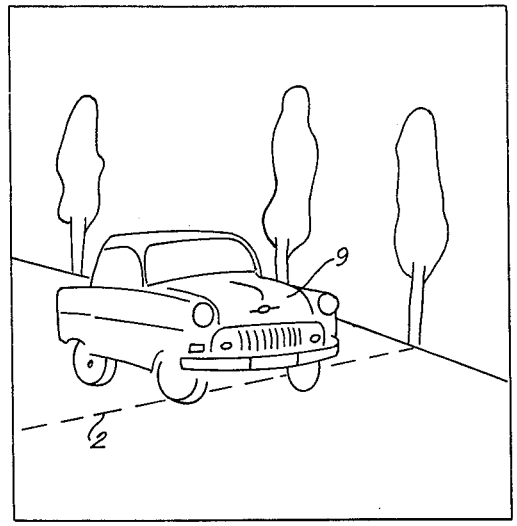
FIG. 2 is an illustration of a photograph taken by one part of the structure of the invention.
Figure 4:
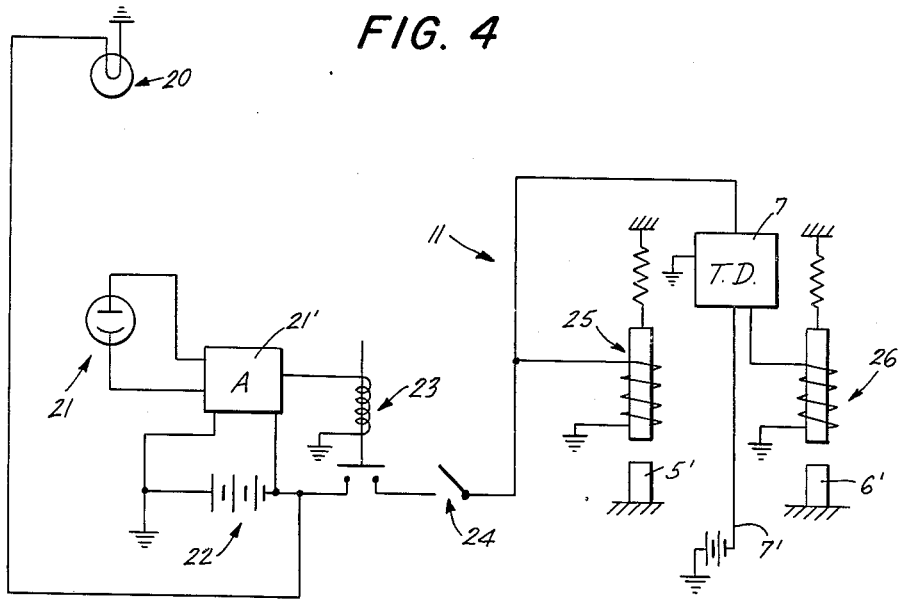
FIG. 4 shows the electrical circuit of the arrangement illustrated in FIG. 1.

The electrical circuit of the embodiment of FIG. 1 is shown in FIG. 4, which is described below, and this electrical circuit is additionally connected with a camera means 5 which is focused at the location of the path determined by the line 2 for photographing the vehicle as it crosses the line 2, the camera means 5 providing a photograph as indicated in FIG. 2. This camera means 5 is automatically actuated upon interruption of the light beam 8, and the photograph produced thereby adds to the value of the evidence since it shows the same vehicle as that of FIG. 3 at the moment when the vehicle crosses the line 2, and furthermore the camera means 5 is located next to the camera means 6 so as to photograph the vehicle from the front thereof so that the front license plate appears in the photograph of FIG. 2.

It is preferred to arrange the pair of camera means 5 and 6 close to each other on any suitable common support, for example, substantially midway between the lines 2 and 3 at one side of the road 1. Each of these camera means may take the form of a camera capable of having objectives of different focal lengths and viewing angles interchangeably attached thereto, and each camera is of the automatic film transporting type. In other words, each camera may include a power spring which automatically transports the film and cocks the shutter after each exposure, so that immediately after one exposure is made each camera automatically resets itself for the next exposure. The interchangeable objectives make it possible to use the cameras with measured road lengths which may vary considerably.

Referring now to FIG. 4, the circuit 11 is indicated therein as well as the electrical interconnection of the light source 20, the photocell 21, and the time delay means 7. FIG. 4 also indicates diagrammatically the shutter release plunger 6' of the camera means 6 and the shutter release plunger 5' of the camera means 5. Solenoids 25 and 26 are provided to cooperate with these plungers for actuating the same to make exposures when the solenoids are energized, each solenoid including an armature maintained by a suitable spring means in a rest position as indicated diagrammatically in FIG. 4.

The circuit 11 derives its power from any suitable source 22 and includes a normally closed relay 23 connected in circuit with an amplifier 21' which is connected electrically with the photocell 21, the light source 20 being connected into the circuit in the manner indicated in FIG. 4. As is apparent from FIG. 4, as long as the light beam provided by the source 20 reaches the photocell 21 the relay 23 will be energized and thus will maintain the circuit 11 open. As soon as the light beam is interrupted, the relay 23 is deenergized and closes circuit 11. This circuit includes a manually operable master switch 24 for turning the entire arrangement on and off. Thus, when the switch 24 is closed and a vehicle interrupts the light beam the relay 23 will become deenergized so as to start the operation of the time delay means 7 when the light beam is interrupted. Furthermore, it will be noted that the deenergizing of the normally closed relay 23 will cause the solenoid 25 to become energized in order to automatically actuate the plunger 5' at the instant that the vehicle crosses the line 2 so that the camera means 5 automatically photographs the vehicle at this instant.

The time delay means 7 together with the solenoid 26 are located in a circuit provided with an independent source of electricity 7', so that once the time delay means 7 has been triggered by deenergizing of the relay 23 this time delay means will energize the solenoid 26 after the fixed predetermined time interval has elapsed even if the relay 23 has in the meantime become energized by the movement of the vehicle beyond the light beam. Thus, after this time interval has elapsed the solenoid 26 will become energized to automatically depress the plunger 6' so that the camera means 6 will make an exposure at this instant.

Figure 5:
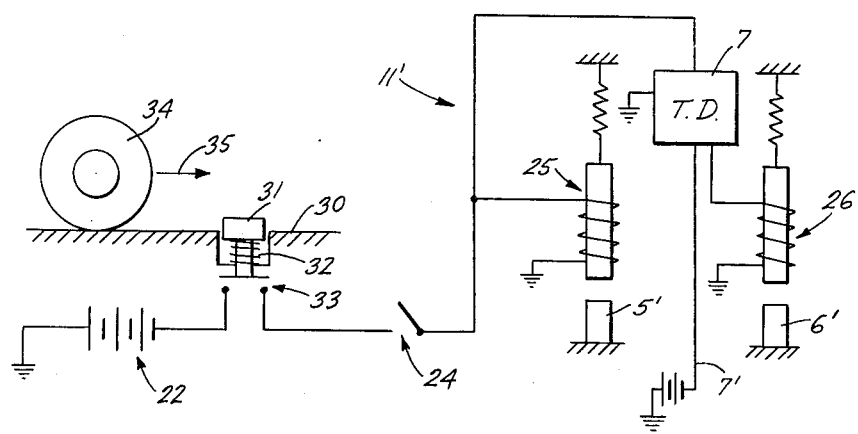
FIG. 5 shows diagrammatically another embodiment of the invention and how it cooperates with the electrical circuit.

Instead of the photocell and the components associated therewith, the invention may be practiced with the embodiment of FIG. 5 where the road bed 30 of the path 1 has at the location of the line 2 an elongated bar 31 maintained by a spring means 32 in a position elevated slightly above the surface of the road bed so as to maintain a switch 33 of the circuit 11' open. A vehicle indicated diagrammatically by the wheel 34 and travelling in the direction of arrow 35 will necessarily depress the bar 31 so as to close the circuit 11'. Otherwise the embodiment of FIG. 5 is identical with that of FIG. 4 and operates the same way to provide one photograph of the vehicle as it enters the measured length of road and another photograph when the vehicle is beyond the measured length of road, assuming that the vehicle is speeding. Otherwise, as was mentioned above, the vehicle will not appear in the second photograph.

The operator may close the switch 24 and leave the apparatus of the invention unattended until all film frames have been exposed. On the other hand, it is also possible for the operator to stay with the apparatus and to close the switch 24 each time the operator suspects that a vehicle located in the path of travel in advance of the line 2 is speeding. As long as the switch 24 is closed before the vehicle reaches the line 2 the apparatus will function in the manner described above. Thus, the operator may maintain the switch 24 open to prevent photographing vehicles which are obviously travelling within the speed limit.

It will be understood that each of the elements described above, or two or more together, may also find a useful application in other types of speed detecting methods and arrangements differing from the types described above.

While the invention has been illustrated and described as embodied in photographic speed detecting methods and arrangements, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various application without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A method for detecting the difference between the actual and a predetermnied speed of a vehicle traveling along a given path, comprising the steps of, selecting along said given path a first and a second reference point spaced from each other a predetermined distance, which distance is traveled by said vehicle within a predetermined time interval when said vehicle is traveling at a predetermined speed; taking a first photograph showing said first reference point and the vehicle traveling along said given path at the instant it passes said first reference point; and taking, after a time interval equal to said predetermined time interval, a second photograph showing said traveling vehicle together with an elongated section of said given path including said second reference point, so that the position of the image of the vehicle along said elongated section in relation to the image of said second reference point on said second photograph is indicative of the difference between the actual speed of the vehicle and said predetermined speed.

2. A method as recited in claim 1 and wherein a time indicator is photographed simultaneously with said elongated section of said path at the end of said fixed time interval so that said second photograph also shows the time when the photograph was taken.

3. A method for detecting the difference between the actual and a predetermined speed of a vehicle traveling along a given path, comprising the steps of, providing along said given path a first and a second marking spaced from each other a predetermined distance, which distance is traveled by said vehicle within a predetermined time interval when said vehicle is traveling at a predetermined speed; taking a first photograph showing said first marking and the vehicle traveling along said given path at the instant it passes said first marking; and taking, after a time interval equal to said predetermined time interval, a second photograph showing said traveling vehicle together with an elongated section of said given path including said second marking, so that the position of the image of the vehicle along said elongated section in relation to the image of said marking on said second photograph is indicative of the difference between the actual speed of the vehicle and said predetermined speed.

4. A method for detecting the difference between the actual and a predetermined speed of a vehicle traveling along a given path, comprising the steps of, providing along said given path a first and a second marking line transverse of said given path spaced from each other a predetermined distance, which distance is traveled by said vehicle within a predetermnied time interval when said vehicle is traveling at a predetermined speed; taking a first photograph showing said first marking line transverse of said given path and the vehicle traveling along said given path at the instant it passes said first marking line transverse of said given path; and taking, after a time interval equal to said predetermined time interval, a second photograph showing said traveling vehicle together with an elongated section of said given path including said second marking line transverse of said given path, so that the position of the image of the vehicle along said elongated section in relation to the image of said second marking line transverse of said given path on said second photograph is indicative of the difference between the actual speed of the vehicle and said predetermined speed.

5. A method for detecting the difference between the actual and a predetermined speed of a vehicle traveling along a given path, comprising the steps of, providing along said given path a first and a second marking line transverse of said given path spaced from each other a predetermined distance, which distance is traveled by said vehicle within a predetermined time interval when said vehicle is traveling at a predetermined speed; taking a first photograph showing said first marking line transverse of said given path and the vehicle substantially in front view traveling along said given path at the instant it passes said first marking line transverse of said given path; and taking, after a time interval equal to said predetermined time interval, a second photograph showing said traveling vehicle substantially in rear view together with a elongated section of said given path including said second marking line transverse of said given path, so that the position of the image of the vehicle along said elongated section in relation to the image of said second marking line transverse of said given path on said second photograph is indicative of the difference between the actual speed of the vehicle and said predetermnied speed.

6. An arrangement for detecting the difference between the actual and a predetermined speed of a vehicle traveling along a given path, comprising, in combination, a first and a second visible marker located along said given path and spaced from each other a predetermined distance which distance is traveled by the vehicle within a predetermined time interval when said vehicle is traveling at a predetermined speed; camera means focused on a selected section of said given path including said first and second visible marker for photographing said vehicle when it is traveling along said selected section of said path, together with sections of said path including said first and second marker, respectively; and actuating means cooperating with said camera means for first actuating said camera means to take a first photograph of said first visible marker and said vehicle at the instant it passes said first marker, and for actuating said camera means a second time to take a second photograph showing said traveling vehicle together with an elongated section of said given path including said second marker after a fixed time interval after taking said first photograph, said fixed time interval being equal to said predetermined time interval, so that the position of the image of the vehicle along said elongated section in relation to the image of said second marker on said second photograph is indicative of the difference between the actual speed of the vehicle and said predetermined speed.

7. An arrangement as recited in claim 6 and wherein said camera means is located in advance of said second marker of said section of said path so as to photograph the rear of the vehicle, whereby the rear license plate of the vehicle appears in the photograph for identification purposes.

8. An arrangement as claimed in claim 6 including electrical operating means cooperating with said camera means for operating the same; time delay means cooperating with said electrical operating means for actuating the same to operate said camera means when said fixed time interval has elapsed after the time delay means has started to operate.

9. An arrangement as recited in claim 6 and wherein both of said camera units are located closely adjacent to each other along said path at a part thereof situated between said first and said second marker so that said first camera unit photographs the front of the vehicle while said second camera unit photographs the rear of the vehicle.

10. An arrangement as recited in claim 9 and wherein both of said camera units are situated substantially midway between said first and second marker.

11. An arrangement as claimed in claim 6, wherein said actuating means include combined sensing and starting means situated in the area of said first reference marking, for sensing when a vehicle is passing said first reference marking and for simultaneously starting the operation of said actuating means.

12. An arrangement as recited in claim 11 and wherein said combined sensing and starting means is located in advance of said camera means so that the latter is located along said path between said first and second marker along said path.

13. An arrangement as recited in claim 6 and wherein said camera means comprise a first camera unit focused on the area of said first marker, and a second camera unit focused on the area of said second marker, said actuating means including sensing means situated in the area of said first marker for sensing a vehicle when it passes said first marker and cooperating with said first camera unit for automatically actuating the same to take a first photograph at the instant when said travelling vehicle is located at said first marker and is sensed by said sensing means, in such a manner that said first camera unit takes a photograph of said vehicle at said first marker.

14. An arrangement as recited in claim 13 and wherein said sensing means includes a photocell at one side of said path and a light source at the other of said path directing a light beam across said path to said photocell, said sensing means sensing a vehicle when it passes said first marker and first actuating said camera means when a vehicle interrupts said light beam.

15. An arrangement as recited in claim 13 and wherein said sensing means is in the form of an electrical switch located at least in part in the space occupied by a vehicle when passing said first marker to be engaged and closed by a vehicle at the instant of passing said first marker.

16. An arrangement for detecting the difference between the actual and a predetermined speed of a vehicle traveling along a given path, comprising, in combination, a first and a second visible marker located along said given path and spaced from each other a predetermined distance which distance is traveled by the vehicle within a predetermined time interval when said vehicle is traveling at a predetermined speed; camera means focused on a selected section of said given path including said first and second visible marker for photographing said vehicle when it is traveling along said selected section of said path, together with sections of said path including said first and second marker, respectively; and actuating means cooperating with said camera means for first actuating said camera means to take a first photograph of said first visible marker and said vehicle at the instant it passes said first marker, and including delay means for actuating said camera means a second time to take a second photograph showing said traveling vehicle together with an elongated section of said given path including said second marker after a fixed time interval after taking said first photograph, said fixed time interval being equal to said predetermined time interval, so that the position of the image of the vehicle along said elongated section in relation to the image of said second marker on said second photograph is indicative of the difference between the actual speed of the vehicle and said predetermined speed.

References Cited in the file of this patent

UNITED STATES PATENTS

| | | |
|---|---|---|
| 2,347,194 | Holliday | Apr. 25, 1944 |
| 2,380,231 | Giffen | July 10, 1945 |
| 2,618,195 | Herman | Nov. 18, 1952 |
| 2,619,402 | McCutcheon | Nov. 25, 1952 |
| 2,683,071 | Pearle | July 6, 1954 |
| 2,871,088 | Abell | Jan. 27, 1959 |
| 2,927,836 | Shore | Mar. 8, 1960 |
| 2,927,837 | Martin | Mar. 8, 1960 |

FOREIGN PATENTS

| | | |
|---|---|---|
| 63,111 | Sweden | Aug. 26, 1924 |
| 744,780 | Germany | Jan. 25, 1944 |